(12) United States Patent
Kray et al.

(10) Patent No.: US 12,442,305 B2
(45) Date of Patent: Oct. 14, 2025

(54) COMPOSITE AIRFOIL ASSEMBLY FOR A TURBINE ENGINE

(71) Applicant: GENERAL ELECTRIC COMPANY, Schenectady, NY (US)

(72) Inventors: Nicholas Joseph Kray, Mason, OH (US); Tod Winton Davis, Cincinnati, OH (US); Gary Willard Bryant, Jr., Loveland, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/327,172

(22) Filed: Jun. 1, 2023

(65) Prior Publication Data

US 2024/0401482 A1 Dec. 5, 2024

(51) Int. Cl.
*F01D 5/14* (2006.01)
(52) U.S. Cl.
CPC .............. *F01D 5/147* (2013.01); *F01D 5/141* (2013.01); *F05D 2220/32* (2013.01)
(58) Field of Classification Search
CPC ........... F01D 5/147; F01D 5/141; F01D 5/282
See application file for complete search history.

(56) References Cited

U.S. PATENT DOCUMENTS

| | | |
|---|---|---|
| 8,105,042 B2 | 1/2012 | Parkin et al. |
| 8,419,374 B2 | 4/2013 | Huth et al. |
| 8,573,947 B2 | 11/2013 | Klinetob et al. |
| 8,696,319 B2 | 4/2014 | Naik |
| 10,145,246 B2 | 12/2018 | Lewis et al. |
| 10,556,367 B2 | 2/2020 | Marin et al. |
| 10,562,241 B2 | 2/2020 | Backhouse |
| 10,760,600 B2 * | 9/2020 | Watson ................... B64C 23/00 |
| 11,149,558 B2 | 10/2021 | Jain et al. |
| 11,203,941 B2 | 12/2021 | Nakano et al. |
| 2011/0052406 A1 | 3/2011 | Bruce et al. |
| 2011/0194941 A1 | 8/2011 | Parkin et al. |
| 2019/0249684 A1 | 8/2019 | Kuroki et al. |
| 2019/0360344 A1 | 11/2019 | Ohbo et al. |

* cited by examiner

Primary Examiner — Michael L Sehn
(74) Attorney, Agent, or Firm — McGarry Bair PC

(57) ABSTRACT

A composite airfoil assembly for a gas turbine engine. The composite airfoil assembly includes a composite airfoil having opposite pressure and suction sides and opposite leading and trailing edges. The pressure side and the suction side extend axially between the leading edge and the trailing edge. The composite airfoil has a laminate skin that is applied to at least a portion of a core. A first cladding and a second cladding, having adjacent segments, are located on the pressure side or the suction side of the composite airfoil.

19 Claims, 6 Drawing Sheets

COMPOSITE AIRFOIL ASSEMBLY FOR A TURBINE ENGINE

TECHNICAL FIELD

The disclosure generally relates to a turbine engine, more specifically, to a composite airfoil assembly for a turbine engine.

BACKGROUND

A turbine engine typically includes an engine core with a compressor section, a combustion section, and a turbine section in serial flow arrangement. A fan section can be provided upstream of the compressor section. The compressor section compresses air which is channeled to the combustion section where it is mixed with fuel, where the mixture is then ignited for generating hot combustion gases. The combustion gases are channeled to the turbine section which extracts energy from the combustion gases for powering the compressor section, as well as for producing useful work to propel an aircraft in flight or to power a load, such as an electrical generator.

Historically, casting is a common manufacturing technique for forming various components of a gas turbine aviation engine. Casting a component involves a mold having a void in the form of a negative of the desired component shape, filling the void with a flowable material, letting the material harden, and removing the mold.

With the advent of composite materials, composites have been used to make components of the gas turbine engine. Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
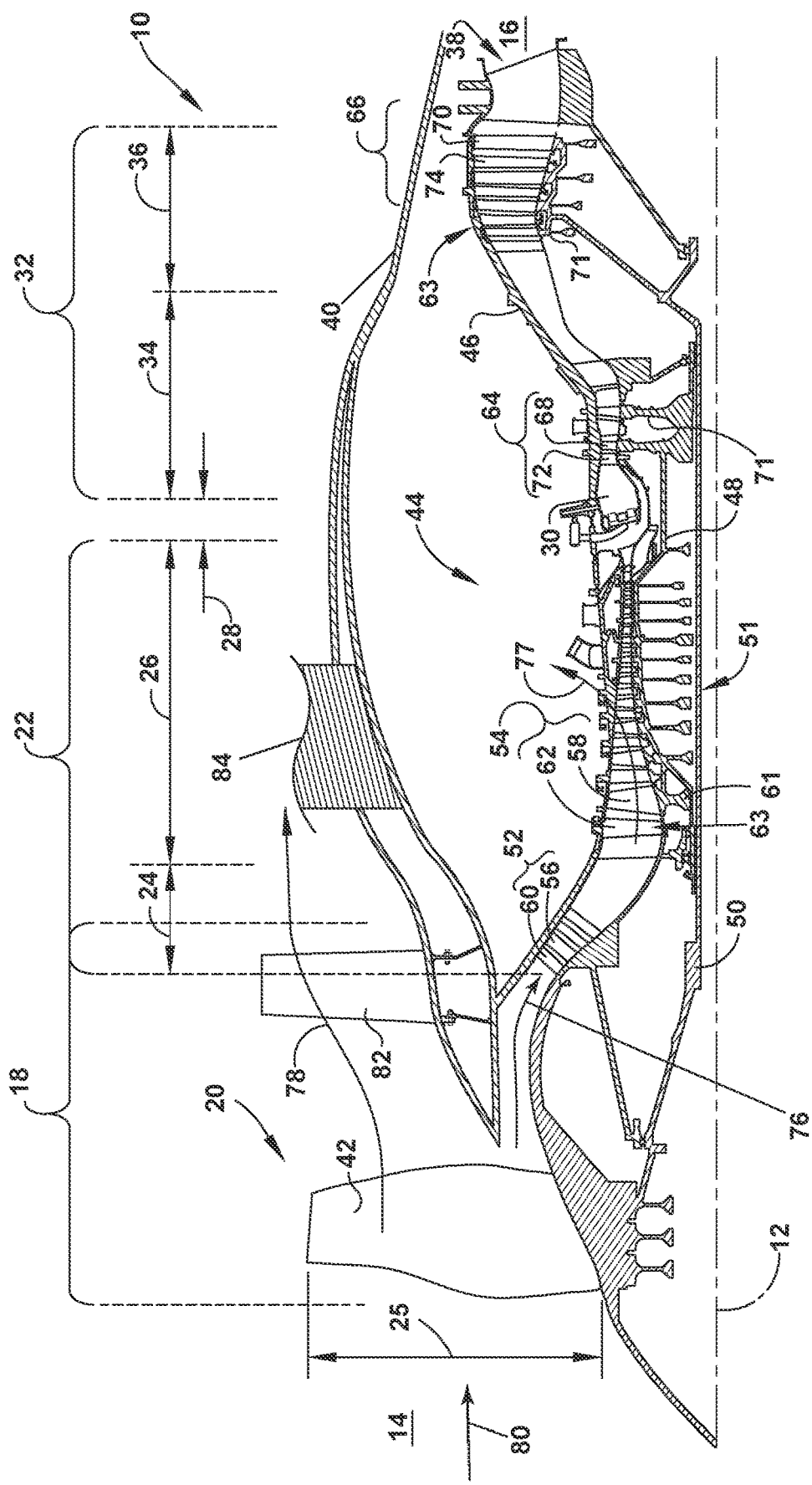
FIG. 1 is a schematic cross-sectional view of an unducted or open rotor turbine engine.

Aspects of the disclosure herein are directed to a composite component to be used to create an engine component for a turbine engine. The composite component is illustrated as a composite airfoil assembly having a composite airfoil with cladding. The composite airfoil includes at least a core and skin illustrated as a woven core and laminate skin. The cladding includes at least a first and second cladding. The at least first and second cladding are coupled to the outside surface of the composite airfoil adjacent a leading edge, a trailing edge, or a tip of the composite airfoil. An interface is defined by a physical arrangement of the at least first and second cladding. Adjacent segments of the at least first and second cladding can define an overlapping interface, an abutting interface, or a gap interface. That is, the adjacent segments of the at least first and second cladding can overlap each other, touch without overlapping, or be spaced to define a gap.

Extreme loading or sudden forces can be applied to the composite components of an aircraft or turbine engine. For example, extreme loading can occur to one or more airfoils during ingestion of various materials by the turbine engine. The overlapping interface can interlock the edges of the discrete parts of the cladding, such that the overlapping interface can providing a continuous surface load path for the cladding during an extreme loading event.

The overlapping interface or the gap interface can compensate for expansion or contraction differences resulting from a changing environment, providing stiffness to the airfoil in case of an extreme loading event in any environment.

It is contemplated that during operating of the turbine engine, the interface can change between the overlapping interface, the abutting interface, or the gap interface. Therefore, in present disclosure, it is assumed, unless otherwise stated, that the interfaces discussed are the interfaces prior to operation of the turbine engine. That is, by way of non-limiting example, if the turbine engine were mounted to an aircraft, the interfaces discussed herein would be prior to a cycle of operation of the aircraft, at an altitude below 40,000 feet, with a temperature in a range from −58° C. to 50° C.

It should be understood, however, that the disclosure applies to other engine components of the turbine engine, not just an airfoil, such as a disk or combustor liner, in non-limiting examples. Further, while described in terms of a core used in the manufacture of an airfoil, it will be appreciated that the present disclosure is applied to any other suitable environment.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", "third", or "fourth" may be used interchangeably to distinguish one component from another and are not intended to signify location or importance of the individual components.

The term "at least one of" in the context of, e.g., "at least one of A, B, and C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The terms "fore" or "forward" mean in front of something and "aft" or "rearward" mean behind something. For example, when used in terms of fluid flow, fore/forward can mean upstream and aft/rearward can mean downstream.

The term "fluid" may be a gas or a liquid, or multi-phase.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. For example, in the overall context of a turbine engine, radial refers to a direction along a ray extending between a center longitudinal axis of the engine and an outer engine circumference. In addition, as used herein, the terms "circumferential" and "circumferentially" refer to directions and orientations that extend arcuately about the centerline of the gas turbine engine.

The terms "coupled," "fixed," "applied to," "attached to" and the like refer to both direct coupling, fixing, or attaching, as well as indirect coupling, fixing, or attaching through one or more intermediate components or features, unless otherwise specified herein.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

As used herein, the term "stiffness" may be used as defining the extent to which a structure resists deformation in response to force. Stiffness can be defined as the ratio of force to displacement of the object under said force. Stiffness can include resisting deformation in response to force applied from various directionalities, whereby the stiffness can represent an axial stiffness, tensile stiffness, compression stiffness, torsional stiffness, or shear stiffness in non-limiting examples.

As used herein, the term "elasticity" may be used as defining the modulus of elasticity (Young's modulus) under tension or compression, and may relate to an elasticity for a particular material or structure made of such material, such as the engine components described herein. The elasticity can represent the stress per unit area relative to the local strain or proportional deformation thereof.

The term "composite," as used herein, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fiber, polymeric resin, thermoplastic, bismaleimide (BMI), polyimide materials, epoxy resin, glass fiber, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic components (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers can be impregnated with a slurry composition prior to forming the preform or after formation of the preform. The preform may then undergo thermal processing and subsequent chemical processing, such as melt-infiltration with silicon, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

The reinforcing fibers can be at least portions of individual filaments or strands. As used herein, a "ceramic fiber tow," a "fiber tow," or simply a "tow" refers to a bundle of a plurality of individual fibers, filaments, or loose strands. The filaments of a tow may be randomly intermingled or arranged in a pattern, and/or may be continuous or non-continuous. For example, a tow may include broken filaments or filament segments. As another example, the filaments of a tow may be substantially parallel, twisted, or otherwise arranged. A tow may act substantially in the same manner as a single or individual filament. It will also be appreciated that an "individual ceramic filament," or simply an "individual filament," as used herein, refers to a singular or non-bundled elongate ceramic member.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbine blades, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, brass, copper, and nickel alloys. A metallic material or alloy can be a combination of at least two or more elements or materials, where at least one is a metal. As used herein, the term "additive manufacturing" generally refers to manufacturing processes wherein a feedstock of material in a particulate powder or wire form aggregates to form a three-dimensional component. The feedstock material is then fused through the application of heat or other curing processes to form a monolithic unitary component, which can have a variety of integral sub-components. Monolithic, as used herein, refers to a unitary structure lacking interfaces or joints by virtue of the materials of each layer fusing to or melting with the materials of adjacent layers such that the individual layers lose their identity in the final unitary structure.

Suitable additive manufacturing techniques in accordance with the present disclosure include, for example, directed energy deposition (DED), fused deposition modeling (FDM), selective laser sintering (SLS), 3D printing such as by inkjets and laserjets, stereolithography (SLA), direct selective laser sintering (DSLS), electron beam sintering (EBS), electron beam melting (EBM), laser engineered net shaping (LENS), laser net shape manufacturing (LNSM), direct metal deposition (DMD), digital light processing (DLP), direct selective laser melting (DSLM), selective laser melting (SLM), direct metal laser melting (DMLM), and other known processes.

The digital light processing (DLP) can include a 3D DLP printer having a transparent vat or transparent tank, a building platform, and a light assembly. The transparent vat or transparent tank can contain, for example, a photopolymer resin.

The DLP building platform can couple to, for example, a motor or other mechanisms permitting the movement of the building platform in one or more dimensions, such as raising or lowering the building platform from or toward the resin in the vat or tank.

A DLP printed component can couple to a lower portion of the building platform facing the vat or tank. The lighting assembly is located, at least in part, below the vat or tank. The lighting assembly can include at least one light source and at least one optical reflector or refractor such as, for example, a deflection mirror or at least one lens.

A controller coupled to or included in the DLP printer can control one or more aspects of the DLP printer such as, for example, the position of the DLP building platform or the intensity, duration, or orientation of the lighting source.

In addition to using a direct metal laser sintering (DMLS), a direct metal laser melting (DMLM) process, or an electron beam melting (EBM) process, where an energy source is used to selectively sinter or melt portions of a layer of powder, it should be appreciated that according to alternative aspects of the present disclosure, the additive manufacturing process can be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent can be, for example, a photo-curable polymer or another liquid bonding agent. Other suitable additive manufacturing methods and variants are intended to be within the scope of the present subject matter.

FIG. 1 is a schematic cross-sectional diagram of a gas turbine engine, specifically an open rotor or unducted turbine engine 10 for an aircraft. The unducted turbine engine 10 has a generally longitudinally extending axis or engine centerline 12 extending from a forward end 14 to an aft end 16. The unducted turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38. The unducted turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a housing, such as a nacelle 40, of the unducted turbine engine 10 extends from the forward end 14 of the unducted turbine engine 10 toward the aft end 16 of the unducted turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the unducted turbine engine 10, specifically, the fan section 18 extends radially outward from the nacelle 40. The fan section 18 includes a set of fan blades 42, and a set of stationary fan vanes 82 downstream the set of fan blades 42, both disposed radially about the engine centerline 12. The unducted turbine engine 10 includes any number of one or more sets of rotating blades or propellers (e.g., the set of fan blades 42) disposed upstream of the set of stationary fan vanes 82. As a non-limiting example, the unducted turbine engine 10 can include multiple sets of fan blades 42 or the set of stationary fan vanes 82. As such, the unducted turbine engine 10 is further defined as an unducted single-fan turbine engine. The unducted turbine engine 10 is further defined by the location of the fan section 18 with respect to the combustion section 28. The fan section 18 can be upstream, downstream, or in-line with the axial positioning of the combustion section 28.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the unducted turbine engine 10.

An HP shaft or spool 48 disposed coaxially about the engine centerline 12 of the unducted turbine engine 10 drivingly connects the HP turbine 34 to the HP compressor 26. An LP shaft or spool 50, which is disposed coaxially about the engine centerline 12 of the unducted turbine engine 10 within the larger diameter annular HP spool 48, drivingly connects the LP turbine 36 to the LP compressor 24 and fan 20. The spools 48, 50 are rotatable about the engine centerline 12 and couple to a set of rotatable elements, which collectively define a rotor 51.

It will be appreciated that the unducted turbine engine 10 is either a direct drive or integral drive engine utilizing a reduction gearbox coupling the LP shaft or spool 50 to the fan 20.

The LP compressor 24 and the HP compressor 26, respectively, include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage of the compressor are mounted to a disk 61, which is mounted to the corresponding one of the HP and LP spools 48, 50, with each stage having its own disk 61. The static compressor vanes 60, 62 for a stage of the compressor are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 are mounted to a disk 71, which is mounted to the corresponding one of the HP and LP spools 48, 50, with each stage having a dedicated disk 71. The static turbine vanes 72, 74 for a stage of the turbine section 32 are be mounted to the engine casing 46 in a circumferential arrangement.

Rotary portions of the unducted turbine engine 10, such as the blades 56, 58 68, 70 among the compressor section 22 and the turbine section 32 are also referred to individually or collectively as the rotor 51. As such, the rotor refers to the combination of rotating elements throughout the unducted turbine engine 10.

Complementary to the rotor portion, the stationary portions of the unducted turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the unducted turbine engine 10.

The nacelle 40 is operatively coupled to the unducted turbine engine 10 and covers at least a portion of the engine core 44, the engine casing 46, or the exhaust section 38. At least a portion of the nacelle 40 extends axially forward or upstream the illustrated position. For example, the nacelle 40 extends axially forward such that a portion of the nacelle 40 overlays or covers a portion of the fan section 18 or a booster section (not illustrated) of the unducted turbine engine 10.

During operation of the unducted turbine engine 10, a freestream airflow 80 flows against a forward portion of the unducted turbine engine 10. A portion of the freestream airflow 80 enters an annular area 25 defined by the swept area between the outer surface of the nacelle 40 and the tip of the blade, with this air flow being an inlet airflow 78. A portion of the inlet airflow 78 enters the engine core 44 and is described as a working airflow 76, which is used for combustion within the engine core 44.

More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the unducted turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the unducted turbine engine 10.

The inlet airflow 78 flows through the set of fan blades 42 and over the nacelle 40 of the unducted turbine engine 10. Subsequently, the inlet airflow 78 flows over at least a portion of the set of stationary fan vanes 82, which directs the inlet airflow 78 such that it is transverse toward the engine centerline 12. The inlet airflow 78 then flows past the set of stationary fan vanes 82, following the curvature of the nacelle 40 and toward the exhaust section 38. A pylon 84 mounts the unducted turbine engine 10 to an exterior structure (e.g., a fuselage of an aircraft, a wing, a tail wing, etc.).

The working airflow 76 and at least some of the inlet airflow 78 merge downstream of the exhaust section 38 of the unducted turbine engine 10. The working airflow 76 and the inlet airflow 78, together, form an overall thrust of the unducted turbine engine 10.

It is contemplated that a portion of the working airflow 76 is drawn as bleed air 77 (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in the heightened temperature environments or a hot portion of the unducted turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
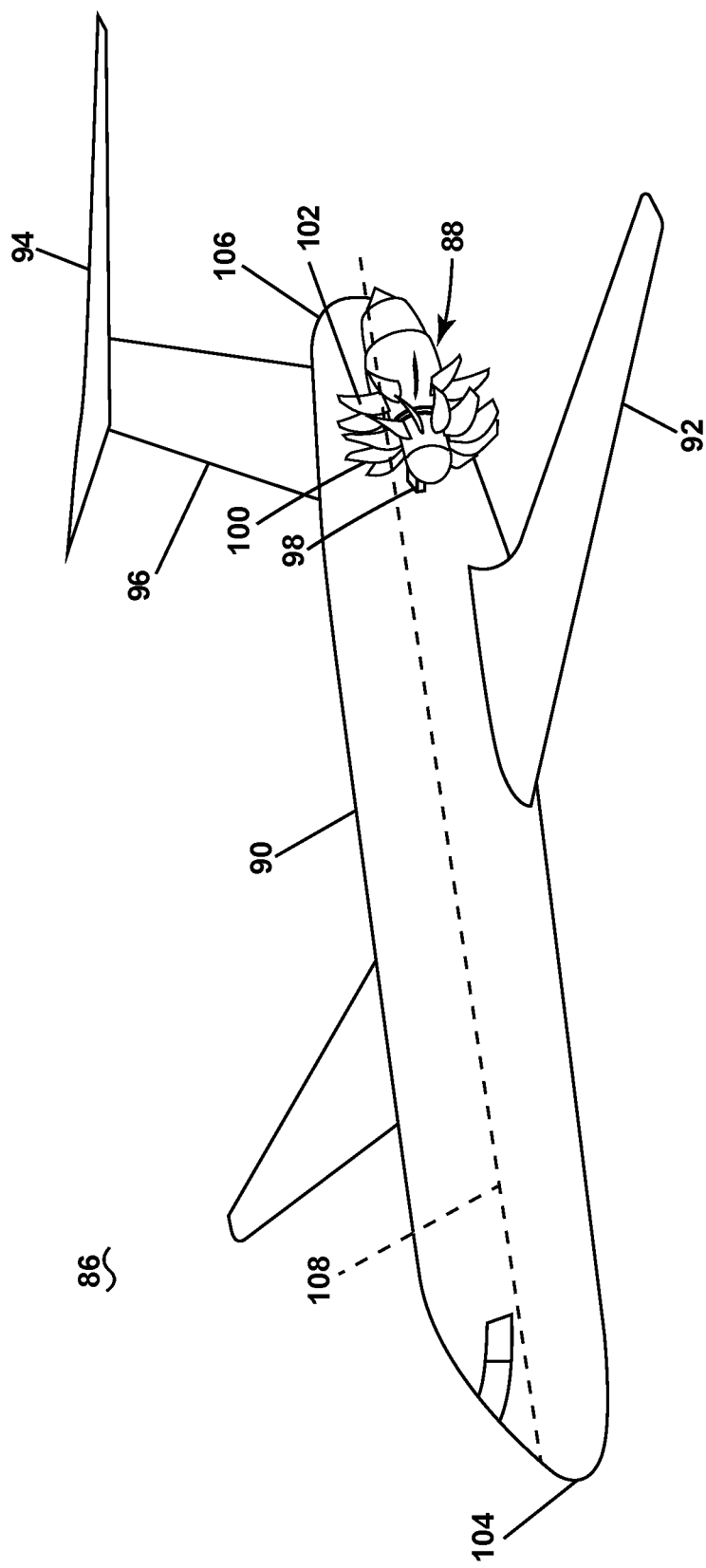
FIG. 2 is a schematic perspective view of an aircraft including the unducted or open rotor turbine engine of FIG. 1.

FIG. 2 is a schematic perspective view of an aircraft 86 including a generic unducted turbine engine 88 suitable for use as the unducted turbine engine 10 of FIG. 1. The aircraft 86 includes a fuselage 90 with an exterior surface. At least one wing 92 and a tail wing 94 extend from the fuselage 90. The tail wing 94 is operably coupled to and spaced from the fuselage 90 via a tail wing pylon 96. The unducted turbine engine 88 is operably coupled to the exterior surface of the fuselage 90 via a pylon 98. The unducted turbine engine 88 includes a set of circumferentially spaced fan blades 100. A set of stationary fan vanes 102 is provided downstream of the set of circumferentially spaced fan blades 100. The fuselage 90 extends between a nose 104 and a tail 106 and includes a fuselage centerline 108 extending therebetween.

Additionally, while the tail wing 94 is a T-wing tail wing (e.g., the tail wing 94 as illustrated), other conventional tail wings are contemplated such as, a cruciform tail wing, an H-tail, a triple tail, a V-tail, an inverted tail, a Y-tail, a twin-tail, a boom-mounted tail, or a ring tail, all of which are referred to herein as the tail wing 94.

Figure 3:
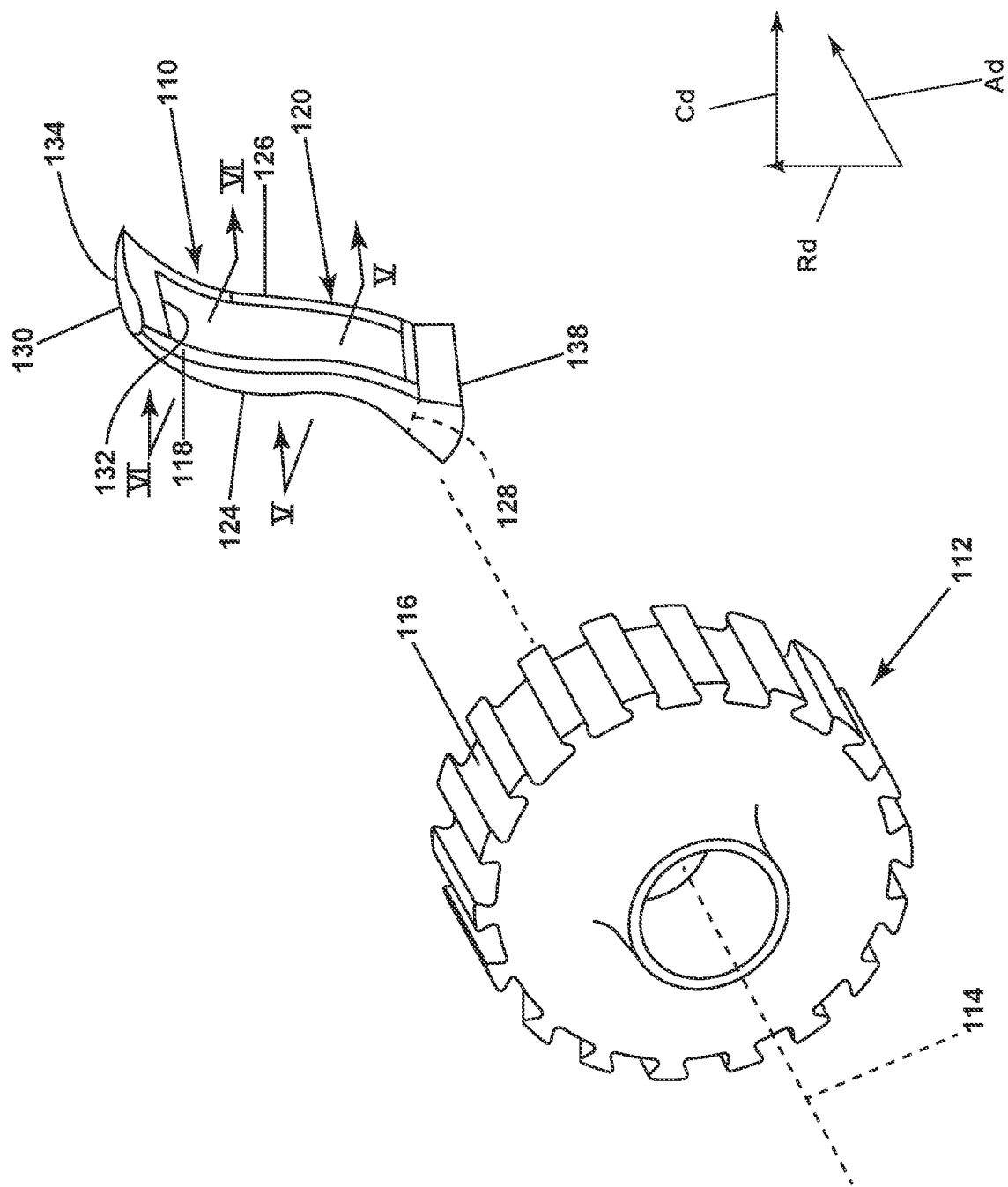
FIG. 3 is a schematic perspective view of a composite airfoil assembly and a disk assembly suitable for use within the turbine engine of FIG. 1 and FIG. 2, the composite blade assembly including a composite airfoil, cladding, and a dovetail, in accordance with an exemplary embodiment of the present disclosure.

FIG. 3 is a schematic perspective view of a composite airfoil assembly 110 and a disk assembly 112 suitable for use within the unducted turbine engine 10 of FIG. 1 or the unducted turbine engine 88 of FIG. 2. The disk assembly 112 is suitable for use as the disk 61, 71 (FIG. 1) or any other disk such as, but not limited to, a disk within the fan section 18, the compressor section 22, or the turbine section 32 of the unducted turbine engine 10. The composite airfoil assembly 110 can be rotating or non-rotating such that the composite airfoil assembly 110 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42 (FIG. 1). As a non-limiting example, the composite airfoil assembly 110 can be a composite fan blade assembly.

The disk assembly 112 can be rotatable or stationary about a rotational axis 114. The rotational axis 114 can coincide with or be offset from the engine centerline (e.g., the engine centerline 12 of FIG. 1). The disk assembly 112 includes a plurality of slots 116 extending axially through a radially outer portion of the disk assembly 112 and being circumferentially spaced about the disk assembly 112, with respect to the rotational axis 114.

The composite airfoil assembly 110 includes a composite airfoil 118 and cladding 120. The composite airfoil 118 extends between a leading edge 124 and a trailing edge 126, opposite the leading edge 124, to define a chord-wise direction. The composite airfoil 118 extends between a root 128 and a tip 130 to define a span-wise direction. The composite airfoil 118 includes a pressure side 132 and a suction side 134, opposite the pressure side 132.

The leading edge 124 and the trailing edge 126, extend radially from the root 128 to the tip 130. The pressure side 132 and the suction side 134, opposite the pressure side 132, extend axially between the leading edge 124 and trailing edge 126. A dovetail portion 138 can extend from the composite airfoil 118.

The composite airfoil assembly 110 is coupled to the disk assembly 112 by inserting at least a portion of the dovetail portion 138 into a respective slot of the plurality of slots 116. The composite airfoil assembly 110 is held in place by frictional contact with the slot 116 or can be coupled to the slot 116 via any suitable coupling method such as, but not limited to, welding, adhesion, fastening, or the like. While only a single composite airfoil assembly 110 is illustrated, it will be appreciated that there can be any number of composite airfoils assemblies 110 coupled to the disk assembly 112. As a non-limiting example, there can be a plurality of composite airfoil assemblies 110 corresponding to a total number of slots of the plurality of slots 116.

For the sake of reference, a set of relative reference directions, along with a coordinate system can be applied to the composite airfoil assembly 110. An axial direction (Ad), can extend from forward to aft and is shown extending at least partially into the page. The axial direction (Ad) and can be arranged parallel to the rotational axis 114. A radial direction (Rd) extends perpendicular to the axial direction (Ad), and can extend perpendicular to the engine centerline 12. A circumferential direction (Cd) can be defined perpendicular to the radial direction (Rd), and can be defined along the circumference of the unducted turbine engine 10 (FIG. 1) relative to the engine centerline 12 (FIG. 1).

Figure 4:
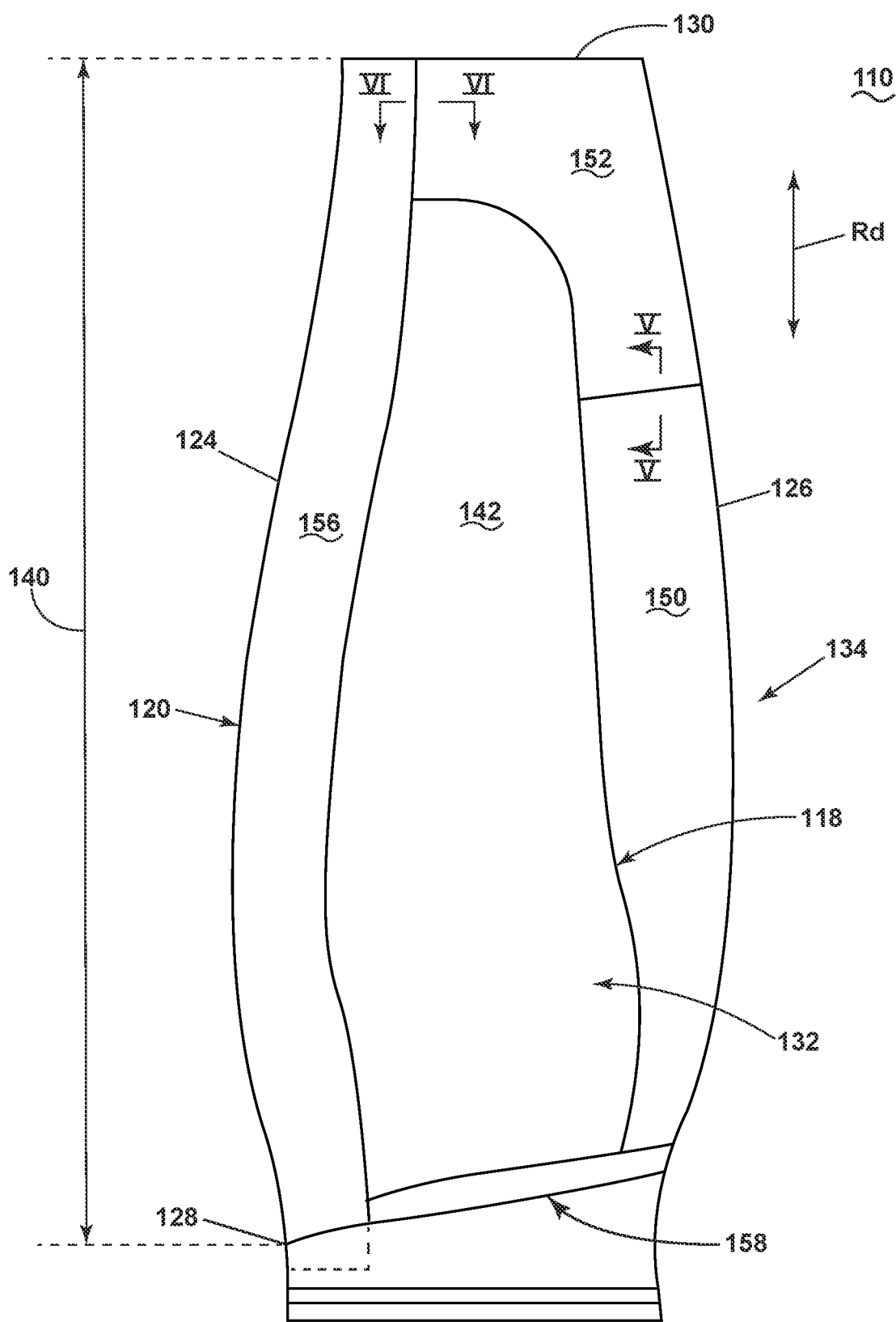
FIG. 4 is an enlarged view of the composite airfoil assembly of FIG. 3, in accordance with an exemplary embodiment of the present disclosure.

FIG. 4 is an enlarged view of the composite airfoil assembly 110 further illustrating the cladding 120. An airfoil length 140 can be measured from the root 128 to the tip 130 of the composite airfoil 118. While illustrated as variable, the airfoil length 140 can be an average length, minimum length, or maximum length measured from the root 128 to the tip 130 of the composite airfoil 118 in the radial direction (Rd).

An outer surface 142 of the composite airfoil 118 is defined by the pressure side 132 and the suction side 134, opposite the pressure side 132. The pressure side 132 and the suction side 134 extend radially in the span-wise direction from the root 128 to the tip 130. The suction side 134 can mirror the pressure side 132 and have the same surface area. However, it is contemplated that the surface area of the suction side can be less than or greater than the surface area of the pressure side 132.

The cladding 120 couples to the outer surface 142 of the composite airfoil 118. The cladding 120 is illustrated, by way of example, as having a first cladding 150, a second cladding 152, and a leading-edge sheath 156 located at the leading edge 124.

Figure 5:
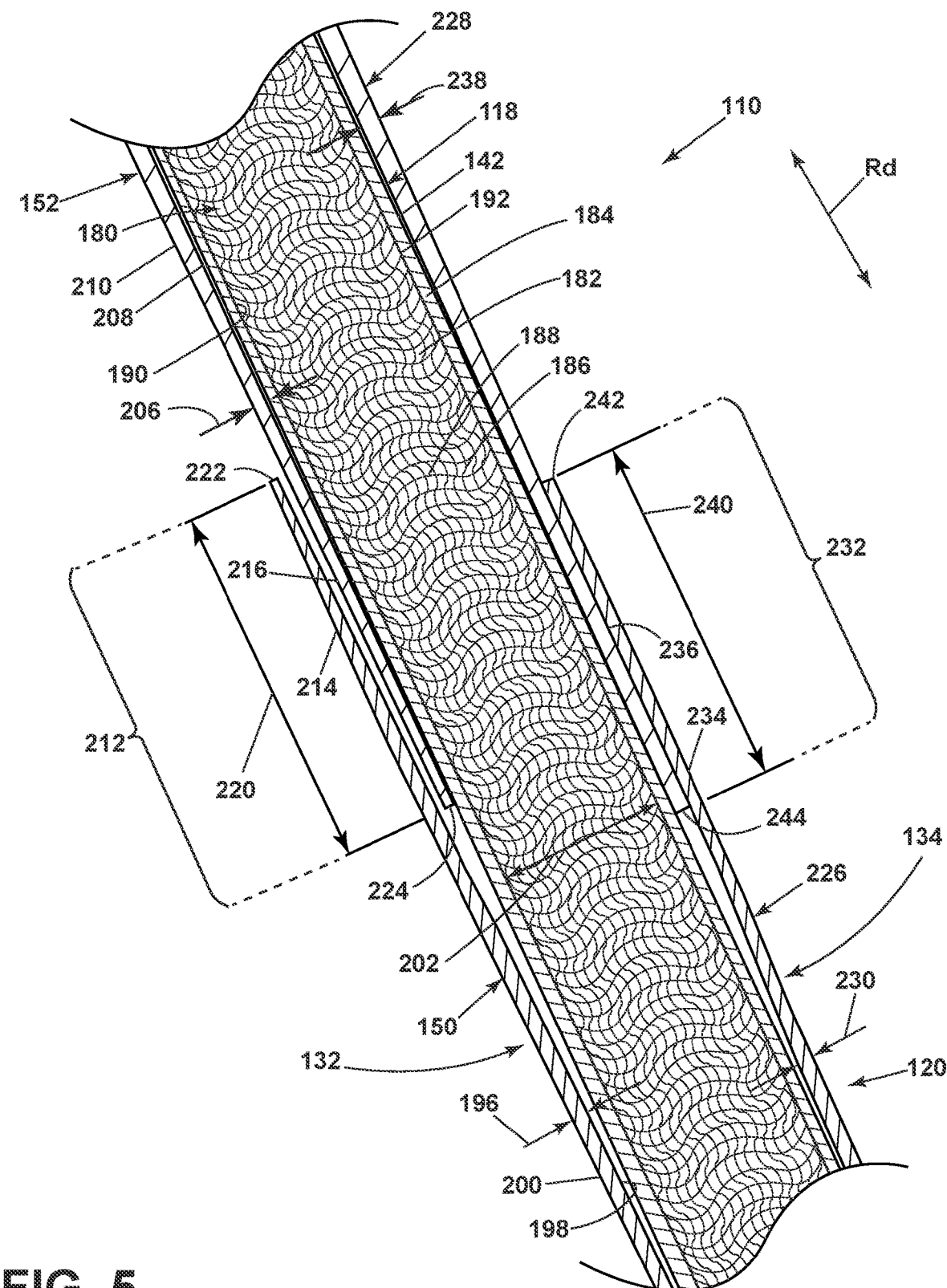
FIG. 5 is a schematic cross-sectional view taken along line V-V of FIG. 4 showing an interior of the composite airfoil and a subset of cladding applied to the composite airfoil, in accordance with an exemplary embodiment of the present disclosure.

The cladding 120 can further include a third cladding 226 (FIG. 5). The third cladding 226 (FIG. 5) can have a similar geometry to the first cladding 150, but located on the suction side 134 at the trailing edge 126. As used herein, when an object has a "similar geometry" to a second object, the surface area of the second object is within 10% of the surface area of the first object. That is, the cladding 120 on the suction side 134 can mirror portions of the cladding on the pressure side 132. However, it is contemplated in a different and non-limiting example, that the cladding 120 on the suction side 134 can differ in size and location when compared to the pressure side 132.

Alternatively, in a different and non-limiting example, the first cladding 150 can be unitarily formed over at least a portion of the trailing edge 126. That is, the first cladding 150 can have parts on both the suction side 134 and the pressure side 132, such that a portion of the first cladding 150 covers a portion of the trailing edge 126. In other words, the first cladding 150 can wrap around at least a portion of the trailing edge 126 of the composite airfoil 118 where a portion of the first cladding 150 is on the pressure side 132 and another portion extends to the suction side 134. In this non-limiting example where the first cladding 150 wraps around the trailing edge 126, the first cladding 150 can have a V-shaped or U-shaped cross-section.

The cladding 120 can further include a fourth cladding 228 (FIG. 5) that can be located on the suction side 134 at the tip 130 opposite of the second cladding 152. While it is contemplated that the fourth cladding 228 (FIG. 5) can have a surface area that has a similar geometry as the second cladding 152, it is also contemplated that the surface area of the fourth cladding 228 (FIG. 5) is smaller than or greater than the surface area of the second cladding 152 by more than 10%.

Alternatively, in a different and non-limiting example, the second cladding 152 can be unitarily formed over at least a portion of the tip 130. That is, the second cladding 152 can have parts on both the suction side 134 and the pressure side 132, such that a portion of the second cladding 152 covers a portion of the tip 130. In other words, the second cladding 152 can wrap around at least a portion of the tip 130 of the composite airfoil 118 where a portion of the second cladding 152 is on the pressure side 132 and another portion extends to the suction side 134.

Optionally, the cladding 120 can further include a root cladding assembly 158 at the root 128 of the composite airfoil 118. The root cladding assembly 158 can include any number of claddings in partial contact with the root on the pressure side 132, the suction side 134, or the trailing edge 126.

By way of non-limiting example, adhesives can be used to couple one or more portions of the cladding 120 to the outer surface 142 of the composite airfoil 118. Examples of adhesives can include epoxy, phenolic, adhesive film, adhesive tape, cyanoacrylate, anaerobic adhesive, thermoplastic adhesive, polymeric resin, or another thermoset adhesive.

Additionally, or alternatively, mechanical fasteners can be used to couple one or more portions of the cladding 120 to the outer surface 142 of the composite airfoil 118.

Alternatively, in a different non-limiting example, one or more portions of the cladding 120 can be applied using additive manufacturing to the outer surface 142 of the composite airfoil 118. That is, the first cladding 150, the second cladding 152, the third cladding 226 (FIG. 5), the fourth cladding 228 (FIG. 5), the leading-edge sheath 156, or the root cladding assembly 158 can be one or more layers additively manufactured onto the outer surface 142 of the composite airfoil 118.

A total surface area of the composite airfoil 118 is defined as a sum of the surface area of the pressure side 132 and the surface area of the suction side 134. The cladding 120 can overlap or cover 0.6% to 70% of the total surface area of the composite airfoil 118. More specifically, the cladding can cover a range from 2% to 60% of the total surface area of the composite airfoil 118. The cladding 120 provides strength or stiffness to the composite airfoil 118 and the range of the total surface area covered by the cladding 120 improves strength or stiffness while maintaining a weight benefit provided by the composite airfoil 118.

It is contemplated that the first cladding 150, the second cladding 152, and the third cladding 226 (FIG. 5) can cover a range from 2% to 60% of a pressure side surface area, a suction side surface area, or a total surface area defined by a sum of the pressure side surface area and the suction side surface area. The range of the total surface area covered by the first cladding 150, the second cladding 152, and the third cladding 226 (FIG. 5) improves strength or stiffness while maintaining a weight benefit provided by the composite airfoil 118.

The first cladding 150 is illustrated, by way of example, as located adjacent the trailing edge 126 of the composite airfoil 118 when mounted, bonded, applied, or otherwise coupled to the outer surface 142 of the composite airfoil 118. As used herein, "adjacent the trailing edge 126" means that the greatest distance measured from the trailing edge 126 to any portion of the adjacent object is less than 30% of the airfoil length 140. Further, the first cladding 150 is illustrated, by way of example, as located at the trailing edge 126 of the composite airfoil 118. That is, at least a portion of the first cladding 150 is in contact with the trailing edge 126 when the first cladding 150 mounted, bonded, applied, or otherwise coupled to the composite airfoil 118.

The second cladding 152 is illustrated, by way of example, as located adjacent the tip 130 of the composite airfoil 118 when mounted, bonded, applied, or otherwise coupled to the outer surface 142 of the composite airfoil 118. Further, the second cladding 152 is illustrated, by way of example, as located at the tip 130 of the composite airfoil 118. That is, at least a portion of the second cladding 152 is in contact with the tip 130 when the second cladding 152 is mounted, bonded, applied, or otherwise coupled to the composite airfoil 118.

While illustrated as an irregular quadrilateral and an irregular pentagon, portions of the cladding 120, such as the first cladding 150 or the second cladding 152 can have a shape that is any combination of one or more regular polygons, irregular polygons, or circles having any number of linear or curved portions.

The cladding 120 can include any number of claddings or cladding assemblies on any one or more of the suction side 134, the pressure side 132, the trailing edge 126, the leading edge 124, or the tip 130.

FIG. 5 shows a schematic cross-sectional view of the composite airfoil assembly 110 of FIG. 3, taken along section V-V, illustrating an interior 180 of the composite airfoil assembly 110 and portions of the cladding 120.

As illustrated, by way of example and to ease understanding, one or more gaps or spaces can be present between the composite airfoil 118 and the first cladding 150 or the second cladding 152. However, it is contemplated that the first cladding 150 or the second cladding 152 can be flush to the composite airfoil 118 by contouring or shaping of one or more of the composite airfoil 118, the first cladding 150, or the second cladding 152 to have complementing geometries. It is further contemplated that one or more layers of adhesive can be located between one or more of the composite airfoil 118, the first cladding 150, or the second cladding 152.

The composite airfoil 118 includes a core illustrated as a woven core 182 and a skin illustrated as a laminate skin 184 provided over the woven core 182. The woven core 182 includes a composite structure having a core bulk modulus. The core bulk modulus is less than a first bulk modulus of the first cladding 150 and a second bulk modulus of the second cladding 152.

The woven core 182 can be dry, with no additional materials, or alternatively, be impregnated with a resin and cured in one non-limiting example. The woven core 182 can be made of a woven structure. Such a woven structure can be a three-dimensional woven structure. More specifically, the woven structure can be woven in a combination of the axial direction (Ad), the radial direction (Rd), and the circumferential direction (Cd) (FIG. 3), while it should be appreciated that the weave pattern can be formed and defined separate from the unducted turbine engine 10 (FIG. 1), such that the weave pattern is woven in any three, mutually-orthogonal planes in order to define a three-dimensional object relative to said planes. In one non-limiting example, the woven structure can include a three-dimensional weaving including a plurality of warp fibers 186 and weft fibers 188 which can be woven in three directions to form a three-dimensional structure for the woven core 182. The three directions for the warp fibers 186 and weft fibers 188 can be defined along or angled relative to the axial direction (Ad), the radial direction (Rd), and the circumferential direction (Cd) (FIG. 3). In one non-limiting example, a Jacquard loom, or 3D weaving machine can be used to create complex three-dimensional woven structures, which can include interweaving one or more composites to form the woven core 182. The woven core 182 can be comprised of composite materials, such as carbon or carbon fibers, glass or glass fibers, nylon, rayon, or other aramid fibers, while other materials such as nickel, titanium, or ceramic composites are contemplated in non-limiting examples.

It is further contemplated that the woven core 182 can be formed as a three-dimensional woven structure, having a braided or a plaited geometry or pattern. A braided or a plaited geometry or pattern can include a weave pattern that includes three or more interlaced fibers that are woven in a repeating pattern, for example. In another non-limiting example, the braided geometry can include a set of fibers or strands that are sequentially laid over one another to define the braided geometry. The woven or braided geometry or pattern can repeat for the entirety of the woven core 182, or only a portion thereof. Such additional braided geometries can be similar, where the arrangement of the fibers is the same, but the orientation is different, or where the arrangement of the fibers is different, and the orientation can be similar or dissimilar. The braided geometry or pattern can be formed with a Jacquard loom or 3D weaving machine with composite materials. A three-dimensional braided structure can include a braided pattern that extends in three dimensions, such as a combination of the axial direction (Ad), the radial direction (Rd), and the circumferential direction (Cd).

The laminate skin 184 can be formed as a set of laminate layers, provided around or about the woven core 182. The laminate skin 184 can be pre-impregnated, fiber placed, or dry fiber laminate layers, in non-limiting examples. Such laminate layers forming the laminate skin 184 can be formed by resin transfer molding (RTM), partial RTM, same qualified resin transfer molding (SQRTM), or out-of-autoclave in non-limiting examples. It is contemplated that the woven core 182 or the laminate skin 184 can be formed by PMC. The laminate skin 184 can include a skin bulk modulus. The skin bulk modulus can be different than the core bulk modulus. In one example, the skin bulk modulus can be greater than the core bulk modulus.

The laminate skin 184 can include a skin interior surface 190 and an exterior surface that defines the outer surface 142 of the composite airfoil 118. The skin interior surface 190 can, at least in part, be in contact with at least a portion of an exterior 192 of the woven core 182. In other words, the laminate skin 184 can be applied to at least a portion of the exterior 192 of the woven core 182.

The first cladding 150 is coupled to the outer surface 142 of the composite airfoil 118 such that a portion of the first inner surface 198 of the first cladding 150 confronts the outer surface 142 of the composite airfoil 118. A first cladding thickness 196 can be measured from the first inner surface 198 to a first outer surface 200 of the first cladding 150.

Similar to the first cladding 150, the second cladding 152 has a second cladding thickness 206, extending from a second inner surface 208 to a second outer surface 210 of the second cladding 152.

The first cladding thickness 196 or the second cladding thickness 206 can be in a range from 0.076 millimeters to 1.016 millimeters. More specifically, the first cladding thickness 196 or the second cladding thickness 206 can be in a range from 0.15 millimeters to 0.51 millimeters.

Additionally, or alternatively, the first cladding thickness 196 or the second cladding thickness 206 can be in a range from 0.0001% to 10% of the airfoil length 140 (FIG. 4). More specifically, the first cladding thickness 196 or the second cladding thickness 206 can be in a range from 0.001% to 2% of the airfoil length 140 (FIG. 4). The range of the first cladding thickness 196 or the second cladding thickness 206 improves strength or stiffness while maintaining a weight benefit.

While illustrated as having a uniform portion and a tapered portion, it is contemplated that the first cladding thickness 196 or the second cladding thickness 206 can vary in any direction, for example, in the axial direction (Ad), radial direction (Rd), or circumferential direction (Cd).

A core thickness 202 can be measured from the pressure side 132 to the suction side 134 across the woven core 182. Additionally, or alternatively, the core thickness 202 can be measured between portions of a first inner surface 198 across the woven core 182. The core thickness 202 can be in a range from 2.54 millimeters to 63.5 millimeters. More specifically, the core thickness 202 can be in a range from 3.17 millimeters to 12.7 millimeters.

Additionally, or alternatively, the core thickness 202 can be in a range from 0.05% to 50% of the airfoil length 140. More specifically, the core thickness 202 can be in a range from 0.2% to 20% of the airfoil length 140. The range of the core thickness 202 provides a desired aerodynamic profile while maintaining a weight benefit.

The first cladding thickness 196 or the second cladding thickness 206 can be in a range from 0.6% to 25% of the core thickness 202. More specifically, the first cladding thickness 196 or the second cladding thickness 206 can be in a range from 4% to 16% of the core thickness 202. The range provided for the first cladding thickness 196 or the second cladding thickness 206 when compared to the core thickness 202 improves strength or stiffness of the composite airfoil assembly 110 while maintaining a weight benefit.

A first interface 212 is defined by a physical arrangement of adjacent segments the first cladding 150 and the second cladding 152. The term "adjacent segments," as used herein, refers to segments or portions of a first object (e.g., first cladding 150) and a second object (e.g., second cladding 152) that overlap, abut, or are spaced a distance less than 3000% of a maximum thickness of either object.

The adjacent segments that define the first interface 212 include a first segment 214 of the first cladding 150 and a second segment 216 of the second cladding 152 on the pressure side 132. The first interface 212 is an overlapping interface, as the first segment 214 overlies, overlaps, or is in contact with the second segment 216.

A first overlap distance or first interface distance 220 can be measured in the radial direction (Rd) from a first end 222 of the first segment 214 to a second end 224 of the second segment 216.

The first interface distance 220 can be in a range from 20% to 400% of the core thickness 202. More specifically, the first interface distance 220 can be in a range from 100% to 340% of the core thickness 202.

Additionally, or alternatively, the first interface distance 220 can be in a range from 0.8% to 50% of the airfoil length 140 (FIG. 4). More specifically, the first interface distance 220 can be in a range from 1% to 8% of the airfoil length 140 (FIG. 4).

The range provided for the first interface distance 220 (as an overlapping interface) provides a continuous surface load path for the first cladding 150 and the second cladding 152 while maintaining a weight benefit.

While illustrated, by way of example, as tapered or having a decreased thickness, it is contemplated that the first segment 214 or the second segment 216 can be uniform in thickness. It is further contemplated in a different and non-limiting example, that the first segment 214 or the second segment 216 can have a greater taper than illustrated. That is, the first cladding thickness 196 or the second cladding thickness 206 measured respectively at the first end 222 or the second end 224 can be 0% to 90% smaller than the first cladding thickness 196 or the second cladding thickness 206 measured respectively at opposite ends of the first end 222 or the second end 224 of the first interface 212.

A second interface 232 is defined by a physical arrangement of adjacent segments of the third cladding 226 and the fourth cladding 228. Optionally, the third cladding 226 can be unitarily formed with the first cladding 150 or the fourth cladding 228 can be unitarily formed with the second cladding 152.

A third cladding thickness 230 and a fourth cladding thickness 238 can be measured similarly to the first and second cladding thicknesses 196, 206. The third cladding thickness 230 or the fourth cladding thickness 238 can be greater than, less than, or equal to the first cladding thickness 196 or the second cladding thickness 206.

The third cladding thickness 230 or the fourth cladding thickness 238 can be in a range from 0.6% to 25% of the core thickness 202. More specifically, the third cladding thickness 230 or the fourth cladding thickness 238 can be in a range from 4% to 16% of the core thickness 202. The range of the third cladding thickness 230 or the fourth cladding thickness 238 improves strength or stiffness while maintaining a weight benefit.

The adjacent segments that define the second interface 232 include a third segment 234 and a fourth segment 236, where the third segment 234 is part of a third cladding 226 and the fourth segment 236 is part of the fourth cladding 228. The third segment 234 and the fourth segment 236 can be on the suction side 134 of the composite airfoil 118.

The second interface 232 is an overlapping interface, as the third segment 234 overlies, overlaps, or is in contact with the fourth segment 236.

A second interface distance 240 can be measured in the radial direction (Rd) from a third end 242 of the third segment 234 to a fourth end 244 of the fourth segment 236. The second interface distance 240 can be in a range from 5% to 400% of the first interface distance 220. More specifically, the second interface distance 240 can be in a range from 50% to 150% of the first interface distance 220. The range for the comparison between the second interface distance 240 and the first interface distance 220 provides the appropriate overlap on the pressure side 132 and the suction side 134 to provide the continuous surface load path needed on pressure side 132 and the suction side 134 while maintaining a weight benefit.

The second interface distance 240 can be in a range from 20% to 400% of the core thickness 202. More specifically, the second interface distance 240 can be in a range from 100% to 340% of the core thickness 202.

Additionally, or alternatively, the second interface distance 240 can be in a range from 0.8% to 50% of the airfoil length 140 (FIG. 4). More specifically, the second interface distance 240 can be in a range from 1% to 8% of the airfoil length 140 (FIG. 4).

The range provided for the second interface distance 240 (as an overlapping interface) provides a continuous surface load path for the third cladding 226 and the fourth cladding 228 while maintaining a weight benefit.

While illustrated, by way of example, as having a generally uniform thickness, it is contemplated that the third segment 234 or the fourth segment 236 can be tapered. It is further contemplated in a different and non-limiting example, that the third segment 234 or the fourth segment 236 can increase or decrease in thickness in a stepped or tiered shape (not shown).

One or more adhesives can be applied between the first segment 214 and the second segment 216 or the third segment 234 and the fourth segment 236. Non-limiting examples of adhesives can include epoxy, phenolic, adhesive film, adhesive tape, cyanoacrylate, anaerobic adhesive, thermoplastic adhesive, polymeric resin, or other thermoset adhesive.

Additionally, or alternatively, one or more mechanical fasteners or mechanical bonds can secure the first segment 214 and the second segment 216 or the third segment 234 and the fourth segment 236. By way of non-limiting example, the first segment 214 and the second segment 216 or the third segment 234 and the fourth segment 236 can be brazed or welded.

In a different and non-limiting example, the first cladding 150, the second cladding 152, the third cladding 226, or the fourth cladding 228 can be mounted, bonded, applied, or otherwise coupled to the composite airfoil 118. It is contemplated that the first cladding 150, the second cladding 152, the third cladding 226, or the fourth cladding 228 can be applied to the composite airfoil 118 using additive manufacturing. Therefore, the first interface 212 or the second interface 232 can be formed by the first segment 214 or the third segment 234 additively manufactured onto the second segment 216 or the fourth segment 236, respectively.

Figure 6:
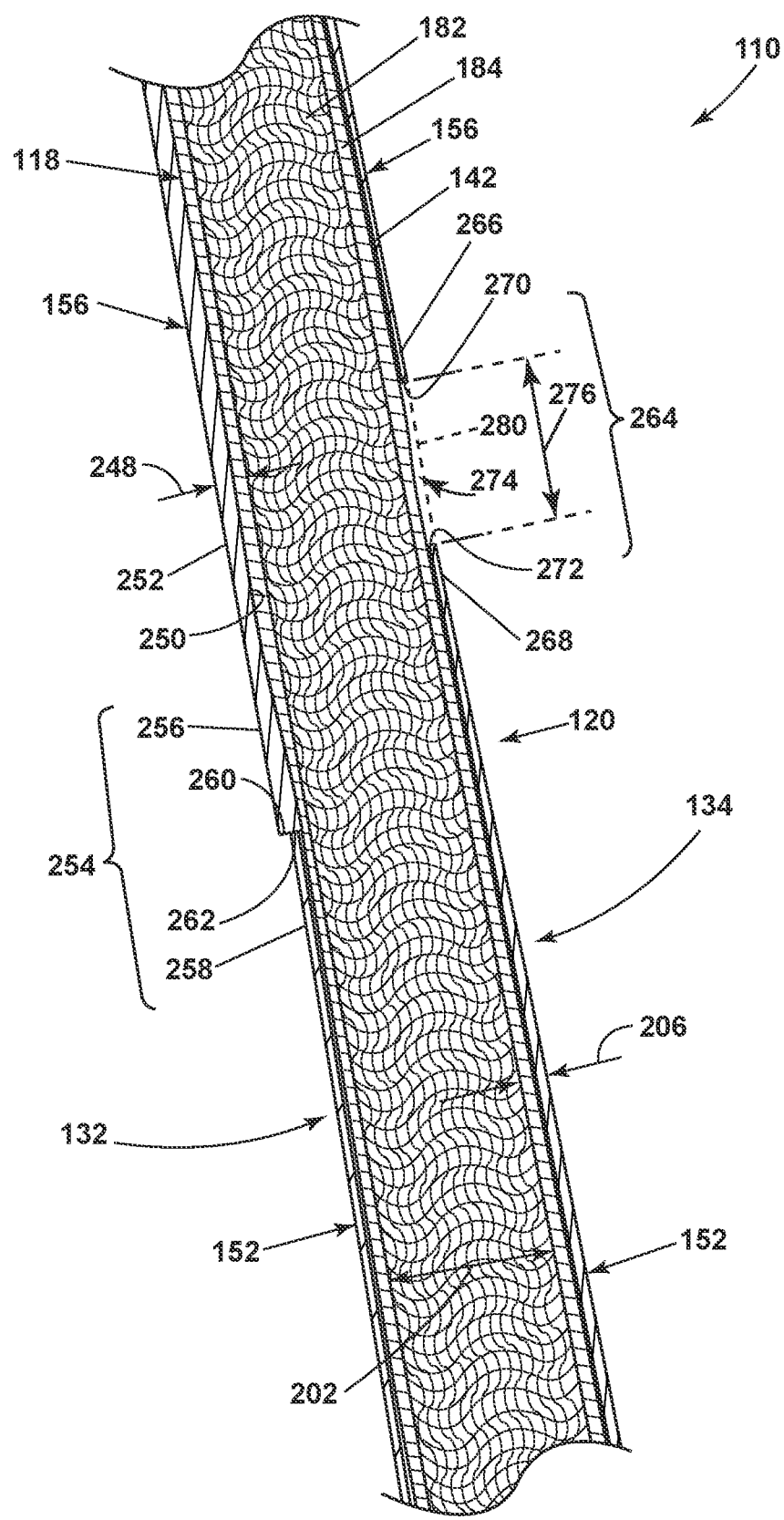
FIG. 6 is a schematic cross-sectional view taken along line VI-VI of FIG. 4 showing the interior of the composite airfoil and another subset of cladding applied to the composite airfoil, in accordance with an exemplary embodiment of the present disclosure.

FIG. 6 shows a schematic cross-sectional view of the composite airfoil assembly 110 of FIG. 3, taken along section VI-VI, illustrating an interior 180 of the composite airfoil assembly 110 and portions of the cladding 120. The leading-edge sheath 156 and the second cladding 152 are illustrated, by way of example, as wrapping around from the pressure side 132 to the suction side 134. That is, the leading-edge sheath 156 or the second cladding 152 can have a V-shaped or U-shaped cross-section. Alternatively, in a different and non-limiting example, it is contemplated that the leading-edge sheath 156 or the second cladding 152 can be only on the pressure side 132 or the suction side 134. That is, the second cladding 152 or the leading-edge sheath 156 illustrated on the pressure side 132 can be separate or discrete cladding from the second cladding 152 or the leading-edge sheath 156 illustrated on the suction side 134.

The leading-edge sheath 156 is coupled to the outer surface 142 of the composite airfoil 118. A sheath thickness 248 can be measured from an inner surface 250 to an outer surface 252 of the leading-edge sheath 156. The sheath thickness 248 can vary in thickness in any direction, for example, in the axial direction (Ad), radial direction (Rd), or circumferential direction (Cd). It is also contemplated that the sheath thickness 248 can vary from the pressure side 132 to the suction side 134.

The sheath thickness 248 can be greater than, less than, or equal to the second cladding thickness 206, the first cladding thickness 196 (FIG. 5), the third cladding thickness 230 (FIG. 5), or the fourth cladding thickness 238 (FIG. 5).

The sheath thickness 248 can be in a range from 0.6% to 20% of the core thickness 202. More specifically, the sheath thickness 248 can be in a range from 4% to 10% of the core thickness 202 of the woven core 182.

The range provided for the sheath thickness 248 when compared to the core thickness 202 improves strength or stiffness required at the leading edge 124 (FIG. 4) of the composite airfoil 118 while maintaining a weight benefit.

A third interface 254 is defined by a physical arrangement of adjacent segments illustrated as a first sheath segment 256 and a first cladding segment 258 on the pressure side 132.

The first sheath segment 256 includes a first sheath end 260. The first cladding segment 258 includes a first cladding end 262. As illustrated, by way of example, the first sheath end 260 abuts the first cladding end 262. That is, the first sheath end 260 touches, contacts, or otherwise confronts the first cladding end 262. The third interface 254 is illustrated, by way of example, as an abutting interface since the first sheath segment 256 abuts the first cladding segment 258.

A fourth interface 264 is defined by a physical arrangement of adjacent segments illustrated as a second sheath segment 266 and a second cladding segment 268 on the suction side 134 of the composite airfoil 118. The second sheath segment 266 includes a second sheath end 270. The second cladding segment 268 includes a second cladding end 272. As illustrated, by way of example, the second sheath end 270 is gapped or spaced from the second cladding end 272.

A gap can be defined as the space between two adjacent cladding segments that define an interface. As illustrated, the fourth interface 264 includes a gap 274 along the composite airfoil 118 between the second sheath segment 266 and the second cladding segment 268.

The fourth interface 264 is illustrated, by way of example, as a gap interface. A gap distance 276 is measured between the second sheath end 270 and the second cladding end 272. The gap distance 276 can be in a range from 5% to 400% of the core thickness 202. More specifically, the gap distance 276 can be in a range from 20% to 340% of the core thickness 202 of the woven core 182.

Additionally, or alternatively, the gap distance 276 can be in a range from 0.4% to 50% of the airfoil length 140 (FIG. 4). More specifically, the first interface distance 220 can be in a range from 0.8% to 8% of the airfoil length 140 (FIG. 4).

The ranges for the gap distance 276 provide a weight benefit while maintaining strength and stiffness of the composite airfoil assembly 110. The gap distance 276 can also provide flexibility. The provided ranges for the gap distance 276 provide the desired amount of flexibility while maintaining strength and weight benefit.

During assembly, referencing FIG. 4-FIG. 6, the laminate skin 184 is applied or otherwise bonded to the woven core 182. The laminate skin 184 can include one or more of a thermoplastic material or composite material. The laminate skin 184 can have a bulk modulus greater than the bulk modulus of the woven core 182.

The laminate skin 184 and the woven core 182 define the composite airfoil 118. Optionally, the composite airfoil 118 can be cured prior to application of the cladding 120.

The cladding 120 can be formed from one or more of a metallic material, thermoplastic material, or composite material. By way of non-limiting example, the first cladding 150, the second cladding 152, or the leading-edge sheath 156 can include one or more of steel or titanium. By way of further non-limiting example, the steel can be a complex phase steel or stainless steel such as 15-5 PH or the titanium can be a titanium alloy such as Ti-6AL-4V.

It is contemplated that the first cladding 150, the second cladding 152, the third cladding 226, the fourth cladding 228, or the leading-edge sheath 156 can be made of similar materials. Alternatively, in another different non-limiting example, the first cladding 150, the second cladding 152, the third cladding 226, the fourth cladding 228, or the leading-edge sheath 156 can be made of different materials.

It is contemplated that the first cladding 150, the second cladding 152, the third cladding 226, the fourth cladding 228, or the leading-edge sheath 156 can be coupled or fixed to the composite airfoil 118 using an adhesive. Additionally, or alternatively, mechanical fastening means or mechanical fasteners can be used to secure one or more portions of the cladding 120 to the composite airfoil 118.

Alternatively, in a different non-limiting example, the first cladding 150, the second cladding 152, the third cladding 226, the fourth cladding 228, or the leading-edge sheath 156 can be applied to the composite airfoil 118 using additive manufacturing.

The first cladding 150, the second cladding 152, the third cladding 226, the fourth cladding 228, or the leading-edge sheath 156, when applied, have adjacent segments. A physical arrangement of the adjacent segments defines an interface, illustrated by way of example as the first interface 212, the second interface 232, the third interface 254, and the fourth interface 264. While illustrated as an overlapping interface, the first interface 212 or the second interface 232 can be an abutting interface or a gap interface. Similarly, the third interface 254 is illustrated, by way of example, as an abutting interface and the fourth interface 264 is illustrated as a gap interface. However, it is contemplated that the third interface 254 can be an overlapping interface or gap interface or the fourth interface 264 can be an overlapping interface or an abutting interface.

While four (4) interfaces 212, 232, 254, 264 are illustrated, any number of interfaces are contemplated. Further, it is contemplated that the interfaces of the cladding 120 can be one or more of an overlapping interface, an abutting interface, or a gap interface, as the physical arrangement of adjacent segments can change in the radial direction.

A coating 280 can be applied directly onto the laminate skin 184. However, it is contemplated that an intermediate adhesive layer is provided between the laminate skin 184 and the coating 280. While illustrated as covering a portion of the laminate skin 184 in the gap 274, the coating 280 can cover the entirety of the laminated skin 184 and be present between the laminate skin 184 and the cladding 120. It is further contemplated that the coating 280 can be provided on the outer surface 142 of the laminated skin 184 at any portion of the laminated skin 184 uncovered by the cladding 120. It is yet further contemplated in a different and non-limiting example that the coating 280 can be applied to one or more portions of the cladding 120. The coating 280 can include a coating bulk modulus that is different or the same as one or more of the core bulk modulus or the skin bulk modulus. It is contemplated that the coating bulk modulus is less than the first bulk modulus, the second bulk modulus, or the third bulk modulus. While illustrated as generally uniform, the coating thickness can vary, for example, in the radial direction (Rd) or axial direction (Ad).

Additionally, the coating 280 can be an environmental barrier coating, for example, which can be used to resist oxidization or corrosion. In another example, the coating 280 can be a thermal barrier coating, at least partially thermally insulating the woven core 182 and laminate skin 184. Additional non-limiting examples of coatings can include an anti-ice coating such as polyurethane, ice-phobic materials, an ultraviolet radiation coating, or an oil barrier coating such as polyethylene or polypropylene. In one additional non-limiting example, the coating 280 can be formed as a polypropylene base layer and a polyurethane layer provided on the polypropylene base layer. It is further contemplated that an exterior paint layer (not shown) may be provided on the exterior of the coating 280, where such a paint layer may provide radiation protection, such as ultraviolet radiation.

During manufacture, the woven core 182 can be formed using composite materials. The woven core 182 can formed defining a specific woven structure. The specific woven structure can be a preform, specified to have a predetermined geometry, or can be cut or otherwise sized and shaped after manufacture of the woven structure, such as by cutting or grinding the woven core 182. The laminate skin 184 can be applied directly onto the woven core 182, or alternatively, it is contemplated that an adhesive material or other layer is provided therebetween. The laminate skin 184 and the core 182 define the composite airfoil 118.

The woven structure of the woven core 182 provides for greater adhesion to the laminate skin 184, as opposed to the adhesion between the laminate skin 184 and a non-woven core, and can provide for improved stiffness transition, elasticity transition, or bulk modulus transition between the woven core 182 and the coating 280 or cladding 120, whereby the difference in stiffness, elasticity, or bulk modulus between adjacent materials is less than that compared to non-adjacent materials, or an airfoil having a non-woven core.

Optionally, additional composite layers, resins, adhesives, or other materials can be added to the composite airfoil 118 prior to curing.

After the composite airfoil 118 is cured, the first cladding 150, the second cladding 152, the third cladding 226, the fourth cladding 228, the leading-edge sheath 156, the root cladding assembly 158, or any combination therein, can be coupled to the outer surface 142 of the composite airfoil 118.

Optionally, it is contemplated that the coating 280 can be added before or after curing. If the coating 280 is applied after the curing, it can be added before or after the first cladding 150, the second cladding 152, third cladding 226, the fourth cladding 228, the leading-edge sheath 156, the root cladding assembly 158, or any combination therein.

The cladding 120 can improve durability of the composite airfoil assembly 110. For example, during an ingestion event, the first cladding 150, the second cladding 152, third cladding 226, the fourth cladding 228, the leading-edge sheath 156, the root cladding assembly 158, or any combination therein, can reduce deflection of the composite airfoil assembly 110.

Overlapping interfaces, such as, for example, the first interface 212 and the second interface 232, can be fastened to one another. The fastening of the overlapping interfaces can include mechanical fasteners, brazing, welding, or adhesive. In a different and non-limiting example, the first cladding 150, the second cladding 152, the third cladding 226, or the fourth cladding 228 can be applied to the composite airfoil 118 using additive manufacturing. Therefore, the overlapping interfaces illustrated by the first interface 212 and the second interface 232 can be formed by first applying the first segment 214 or the third segment 234. Then, using additive manufacturing to apply the second segment 216 over the first segment 214 or the fourth segment 236 over the third segment 234.

Benefits of aspects of the invention include, for the overlapping interface, interlock of the bonded cladding by overlapping the free edges during the bonding process.

Additionally benefits include, for the overlapping interface, providing a continuous surface load path for the cladding.

The overlapping interface or the gap interface can compensate for expansion or contraction differences resulting from a changing environment. That is, the interfaces can compensate for the different ways in which the materials used for the composite airfoil and the cladding expand or contract due to temperature, pressure, or other environmental factors.

There are weight benefits to using a composite airfoil having a cladding with a greater bulk modulus than the woven core and the laminate skin. The cladding, when added to the composite airfoil, can provide improved resistance to torsion, impact, or other forces caused by impact or rotation while maintaining a weight benefit.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A composite airfoil assembly for a turbine engine, the composite airfoil assembly comprising a composite airfoil having an outer surface defining a pressure side and an opposing suction side, with the pressure side and the suction side extending between a leading edge and a trailing edge to define a chord-wise direction and between a root and a tip to define a span-wise direction, the composite airfoil comprising a core comprising a composite structure, and a laminate skin applied to at least a portion of an exterior of the core, wherein the laminate skin defines at least a portion of the outer surface of the composite airfoil, a first cladding and a second cladding having adjacent segments, wherein the first cladding and the second cladding are each coupled to the pressure side or the suction side and located at the trailing edge, the leading edge, or the tip of the composite airfoil, and an interface defined by a physical arrangement of the adjacent segments of the first cladding and the second cladding.

The composite airfoil assembly of any preceding clause, wherein the interface comprises an overlapping interface defined by an overlap of the adjacent segments.

The composite airfoil assembly of any preceding clause, wherein the overlapping interface has an interface distance in a range from 20% to 400% of a core thickness.

The composite airfoil assembly of any preceding clause, wherein the overlapping interface has an interface distance in a range from 0.8% to 50% of an airfoil length, wherein the airfoil length is measured from the root to the tip of the composite airfoil.

The composite airfoil assembly of any preceding clause, wherein the adjacent segments of the overlapping interface are adhesively bonded to one another.

The composite airfoil assembly of any preceding clause, wherein the adjacent segments of the overlapping interface are mechanically bonded to one another.

The composite airfoil assembly of any preceding clause, wherein the mechanical bond includes welding or brazing at least a portion of the adjacent segments at the interface together.

The composite airfoil assembly of any preceding clause, wherein the first cladding or the second cladding include one or more layers additively manufactured onto the composite airfoil.

The composite airfoil assembly of any preceding clause, wherein the interface is a gap interface defined by a space between the adjacent segments of the first cladding and the second cladding, wherein the gap interface has a gap distance measured between the spaced adjacent segments of the first cladding and the second cladding, wherein the gap distance is less than 50% of an airfoil length, wherein the airfoil length is measured from the root to the tip of the composite airfoil.

The composite airfoil assembly of any preceding clause, wherein the gap distance is in a range from 0.8% to 8% of the airfoil length.

The composite airfoil assembly of any preceding clause, wherein the gap distance is in a range from 20% to 340% of a core thickness.

The composite airfoil assembly of any preceding clause, further comprising a third cladding coupled to the suction side or the pressure side.

The composite airfoil assembly of any preceding clause, wherein the interface is a first interface and a segment of the third cladding adjacent to a segment of the first cladding or the second cladding defines a second interface.

The composite airfoil assembly of any preceding clause, further comprising a fourth cladding coupled to the suction side or the pressure side.

The composite airfoil assembly of any preceding clause, wherein the interface is a first interface and a segment of the fourth cladding adjacent to a segment of the first cladding or the second cladding defines another interface.

The composite airfoil assembly of any preceding clause, further comprising a root cladding assembly, wherein at least a portion of the root cladding assembly is coupled to the suction side or the pressure side.

The composite airfoil assembly of any preceding clause, wherein the interface is a first interface and a segment of the root cladding assembly adjacent to a segment of the first cladding or the second cladding defines a another interface.

The composite airfoil assembly of any preceding clause, wherein the first interface is an overlapping interface and the second interface is an overlapping interface, an abutting interface, or a gap interface.

The composite airfoil assembly of any preceding clause, wherein the first interface is a gap interface and the second interface is an overlapping interface, an abutting interface, or a gap interface.

The composite airfoil assembly of any preceding clause, wherein the first interface is located at the trailing edge on the pressure side and the second interface is located at the trailing edge on the suction side.

The composite airfoil assembly of any preceding clause, wherein the first interface is located at the trailing edge and the second interface is located at the tip.

The composite airfoil assembly of any preceding clause, wherein the interface is located at the trailing edge.

The composite airfoil assembly of any preceding clause, wherein the interface is located at the tip.

A gas turbine engine comprising a fan section, a compressor section, a combustion section, and a turbine section in serial flow arrangement, and defining an engine centerline, and a composite airfoil assembly rotatable about the engine centerline, the composite airfoil assembly comprising a composite airfoil having an outer surface defining a pressure side and an opposing suction side, with the pressure side and suction sides extending between leading edge and a trailing edge to define a chord-wise direction and between a root and a tip to define a span-wise direction, the composite airfoil comprising a core comprising a composite structure, and a skin applied to at least a portion of an exterior of the core, wherein the skin defines at least a portion of the outer surface of the composite airfoil, a first cladding and a second cladding having adjacent segments, wherein the first cladding or the second cladding are coupled to the pressure side or the suction side and located at the trailing edge, the leading edge, or the tip of the composite airfoil, and an interface defined by a physical arrangement of the adjacent segments of the first cladding and the second cladding.

The gas turbine engine of any preceding clause, wherein the first cladding and the second cladding are located at the trailing edge or the tip.

The gas turbine engine of any preceding clause, wherein the first cladding and the second cladding include steel or titanium.

The gas turbine engine of any preceding clause, wherein the interface is located at the trailing edge.

The gas turbine engine of any preceding clause, wherein the interface is located at the tip.

The gas turbine engine of any preceding clause, wherein the interface is an overlapping interface or a gap interface.

The composite airfoil assembly of any preceding clause, wherein the core is a woven core that includes a three-dimensional weave pattern and the skin is a laminate skin applied to the woven core.

The composite airfoil assembly of any preceding clause, wherein the core is a woven core that includes a three-dimensional weave pattern.

The composite airfoil assembly of any preceding clause, wherein the woven core or the laminate skin is formed by PMC.

The composite airfoil assembly of any preceding clause, wherein the three-dimensional weave pattern includes a braided pattern.

The composite airfoil assembly of any preceding clause, wherein the woven core is made from a different material than the laminate skin.

What is claimed is:

1. A composite airfoil assembly for a turbine engine, the composite airfoil assembly comprising:
   a composite airfoil having an outer surface defining a pressure side and an opposing suction side, with the pressure side and the suction side extending between a leading edge and a trailing edge to define a chord-wise direction and between a root and a tip to define a span-wise direction, the composite airfoil comprising:
a core comprising a composite structure; and
a laminate skin applied to at least a portion of an exterior of the core, wherein the laminate skin defines at least a portion of the outer surface of the composite airfoil;
a first cladding located at the trailing edge and a second cladding located at the tip, wherein the first cladding and the second cladding are coupled to the pressure side or the suction side and have adjacent segments; and wherein the first cladding extends toward the tip in the span-wise direction to a first end, the second cladding extends toward the root in the span-wise direction to a second end, and an interface is defined by a physical arrangement of the adjacent segments of the first cladding and the second cladding, wherein the interface is an overlapping interface or gap interface in the span-wise direction that extends from the first end and terminates at the second end.

2. The composite airfoil assembly of claim 1, wherein the interface is an overlapping interface defined by an overlap of the adjacent segments.

3. The composite airfoil assembly of claim 2, wherein the overlapping interface has an interface distance in a range from 20% to 400% of a core thickness.

4. The composite airfoil assembly of claim 2, wherein the overlapping interface has an interface distance in a range from 0.8% to 50% of an airfoil length, wherein the airfoil length is measured from the root to the tip of the composite airfoil.

5. The composite airfoil assembly of claim 2, wherein the adjacent segments of the overlapping interface are adhesively bonded to one another.

6. The composite airfoil assembly of claim 2, wherein the adjacent segments of the overlapping interface are mechanically bonded to one another.

7. The composite airfoil assembly of claim 1, wherein the interface is a gap interface defined by a space between the adjacent segments of the first cladding and the second cladding, wherein the gap interface has a gap distance measured between the spaced adjacent segments of the first cladding and the second cladding, wherein the gap distance is less than 50% of an airfoil length, wherein the airfoil length is measured from the root to the tip of the composite airfoil.

8. The composite airfoil assembly of claim 7, wherein the gap distance is in a range from 0.8% to 8% of the airfoil length.

9. The composite airfoil assembly of claim 7, wherein the gap distance is in a range from 20% to 340% of a core thickness.

10. The composite airfoil assembly of claim 1, further comprising a third cladding coupled to the other of the suction side or the pressure side opposite the first cladding.

11. The composite airfoil assembly of claim 10, wherein the interface is a first interface and a segment of the third cladding adjacent to a segment of the second cladding defines a second interface.

12. The composite airfoil assembly of claim 11, wherein the first interface is an overlapping interface and the second interface is an overlapping interface, an abutting interface, or a gap interface.

13. The composite airfoil assembly of claim 11, wherein the first interface is a gap interface and the second interface is an overlapping interface, an abutting interface, or a gap interface.

14. A gas turbine engine comprising:
a fan section, a compressor section, a combustion section, and a turbine section in serial flow arrangement, and defining an engine centerline; and
a composite airfoil assembly rotatable about the engine centerline, the composite airfoil assembly comprising:
a composite airfoil having an outer surface defining a pressure side and an opposing suction side, with the pressure side and suction side extending between a leading edge and a trailing edge to define a chord-wise direction and between a root and a tip to define a span-wise direction, the composite airfoil comprising:
a core comprising a composite structure; and
a skin applied to at least a portion of an exterior of the core, wherein the skin defines at least a portion of the outer surface of the composite airfoil;
a first cladding and a second cladding having adjacent segments, wherein the first cladding and the second cladding contact the pressure side and the suction side and located at the trailing edge, the leading edge, or the tip of the composite airfoil;
a first interface defined by a physical arrangement of the adjacent segments of the first cladding and the second cladding on the suction side; and
a second interface defined by a physical arrangement of the adjacent segments of the first cladding and the second cladding on the pressure side;
wherein the first interface is a gap interface defined by a space between the adjacent segments of the first cladding and the second interface is an overlapping interface defined by an overlap of the adjacent segments of the first cladding and the second cladding.

15. The gas turbine engine of claim 14, wherein the first cladding and the second cladding are located at the leading edge or the tip.

16. The gas turbine engine of claim 14, wherein the second interface is located at the trailing edge.

17. The composite airfoil assembly of claim 14, wherein the first interface has a gap distance measured between the spaced adjacent segments of the first cladding and the second cladding; and the gap distance is less than 50% of an airfoil length, wherein the airfoil length is measured from the root to the tip of the composite airfoil.

18. The composite airfoil assembly of claim 17, wherein the gap distance is in a range from 0.8% to 8% of the airfoil length.

19. A composite airfoil assembly for a turbine engine, the composite airfoil assembly comprising:
a composite airfoil having an outer surface defining a pressure side and an opposing suction side, with the pressure side and the suction side extending between a leading edge and a trailing edge to define a chord-wise direction and between a root and a tip to define a span-wise direction, the composite airfoil comprising:
a core comprising a composite structure; and
a laminate skin applied to at least a portion of an exterior of the core, wherein the laminate skin defines at least a portion of the outer surface of the composite airfoil;
a first cladding and a second cladding having adjacent segments, wherein the first cladding and the second cladding are each coupled to the pressure side or the suction side and located at the trailing edge, the leading edge, or the tip of the composite airfoil;
an interface defined by a physical arrangement of the adjacent segments of the first cladding and the second cladding, wherein the interface is a gap interface having a gap distance measured between the spaced adjacent segments of the first cladding and the second cladding; and the gap distance is in a range from 0.8% to 8% of an airfoil length, wherein the airfoil length is measured from the root to the tip of the composite airfoil; and
a third cladding having adjacent segments with the first cladding or the second cladding, wherein the adjacent segments overlap.

* * * * *